United States Patent
Prior

(10) Patent No.: US 7,909,026 B2
(45) Date of Patent: Mar. 22, 2011

(54) SERVO-ACTUATED SUPERCHARGER OPERATING MECHANISM

(75) Inventor: Gregory P. Prior, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 517 days.

(21) Appl. No.: 12/103,743

(22) Filed: Apr. 16, 2008

(65) Prior Publication Data
US 2009/0260357 A1    Oct. 22, 2009

(51) Int. Cl.
F02B 33/00 (2006.01)
F02B 33/44 (2006.01)
F04C 18/16 (2006.01)
F04C 18/12 (2006.01)
F04C 18/00 (2006.01)
F04C 2/00 (2006.01)
F16D 25/02 (2006.01)
F16D 27/08 (2006.01)
F16D 47/00 (2006.01)
F16D 21/08 (2006.01)
F16D 25/00 (2006.01)

(52) U.S. Cl. ........ 123/559.3; 123/559.1; 418/201.1; 418/206.1; 60/597; 192/48.2; 192/48.3; 192/48.601; 192/48.7; 192/85.02

(58) Field of Classification Search .... 123/559.1–559.3, 123/597; 418/201.1, 206.1; 192/48.2, 48.3, 192/48.601, 48.7, 85.02
See application file for complete search history.

(56) References Cited

U.S. PATENT DOCUMENTS

| 2,477,003 | A | * | 7/1949 | Paget | 418/87 |
| 3,630,040 | A | * | 12/1971 | Goldfarb | 418/88 |
| 3,932,073 | A | * | 1/1976 | Schibbye et al. | 418/97 |
| 4,594,992 | A | * | 6/1986 | Nakamura et al. | 123/559.1 |
| 5,232,656 | A | * | 8/1993 | Kotlyar et al. | 123/559.1 |
| 5,791,315 | A | * | 8/1998 | Riach et al. | 376/219 |
| 5,879,259 | A | * | 3/1999 | Teraoka et al. | 475/136 |
| 5,938,420 | A | * | 8/1999 | Teraoka | 418/201.1 |
| 6,058,916 | A | * | 5/2000 | Ozawa | 123/559.3 |
| 6,135,257 | A | * | 10/2000 | Englund | 192/70.12 |
| 6,142,759 | A | * | 11/2000 | Tateno et al. | 418/206.1 |
| 6,184,603 | B1 | * | 2/2001 | Hamai et al. | 310/75 R |
| 6,331,103 | B1 | * | 12/2001 | Teraoka | 418/201.1 |
| 6,539,711 | B1 | * | 4/2003 | Raychinov | 60/597 |
| 6,860,730 | B2 | * | 3/2005 | Leppanen | 418/201.2 |
| 6,981,855 | B2 | * | 1/2006 | Leppanen | 418/201.1 |
| 7,621,263 | B2 | * | 11/2009 | Eybergen et al. | 123/559.3 |

FOREIGN PATENT DOCUMENTS

| JP | 08021253 A | * | 1/1996 |
| JP | 09207793 A | * | 8/1997 |
| JP | 10167089 A | * | 6/1998 |
| WO | WO 9715759 A1 | * | 5/1997 |

* cited by examiner

Primary Examiner — Thai Ba Trieu

(57) ABSTRACT

The present invention provides a servo actuated operating mechanism for a coacting lobed rotor positive displacement supercharger combining a low cost and capacity electromagnetic clutch with a small oil pump internal to the supercharger unit. The oil pump supplies on demand oil pressure from oil in a hydraulic clutch housing or the supercharger timing gear case and acts as a servomechanism to actuate an internal hydraulic clutch. The hydraulic clutch can be engaged over a much wider range of speeds and loads than is possible with an electromagnetic clutch alone. The electro-hydraulic servo-mechanism provides improved highway fuel economy relative to an electromagnetic clutch as the engagement speed could be moved to a higher rotational speed (rpm). The internal hydraulic system makes higher supercharger engagement speeds possible with a hydraulic system, but without the assembly and leak issues associated with externally plumbed engine oil system actuated clutches.

14 Claims, 2 Drawing Sheets

SERVO-ACTUATED SUPERCHARGER OPERATING MECHANISM

TECHNICAL FIELD

This invention relates to clutches for positive displacement air pumps or superchargers, such as roots type blowers or screw compressors utilized for automotive engine superchargers and other purposes.

BACKGROUND OF THE INVENTION

It is known in the art to utilize positive displacement superchargers having interleaved lobed coacting rotors for supercharging internal combustion engines and for providing compressed air for other purposes. In automotive use, such supercharged engines often emply clutches between an engine connected drive mechanism and the supercharger to disconnect the supercharger drive when supercharged operation is not required. This reduces the parasitic drive loads under many common driving conditions. The clutches are usually hydraulically or electro-magnetically actuated.

Engine oil pressure has been used to hydraulically actuate supercharger clutches. This enables high speed and load actuation, but it has the disadvantage of long external oil lines and multiple connections that increase the complexity and leak potential of supercharger installations. A typical alternative is an electromagnetic clutch, which may be adapted from air conditioner clutches. These systems are relatively low in cost but generally have low torque capacity, so the clutch must be engaged at a fairly low speed. This results in poor highway fuel economy when the supercharger is actuated when not needed.

SUMMARY OF THE INVENTION

The present invention provides a solution by providing a servo-actuated operating mechanism combining a low cost and capacity electromagnetic clutch with a small oil pump internal to the supercharger unit. The oil pump supplies on demand oil pressure from oil in a hydraulic clutch housing or the supercharger timing gear case and acts as a servomechanism to actuate an internal hydraulic clutch. The hydraulic clutch can be engaged over a much wider range of speeds and loads than is possible with an electromagnetic clutch alone. The addition of an accumulator would enable even faster engagements.

The electro-hydraulic servomechanism would result in improved highway fuel economy relative to an electromagnetic clutch as the engagement speed could be moved to a higher rotational speed (rpm). The internal hydraulic system would enable the higher supercharger engagement speeds possible with a hydraulic system, but without the assembly and leak issues associated with externally plumbed engine oil system actuated clutches.

These and other features and advantages of the invention will be more fully understood from the following detailed description of exemplary embodiments taken together with the accompanying drawings.

DESCRIPTION OF AN EXEMPLARY EMBODIMENT

Figure 1:
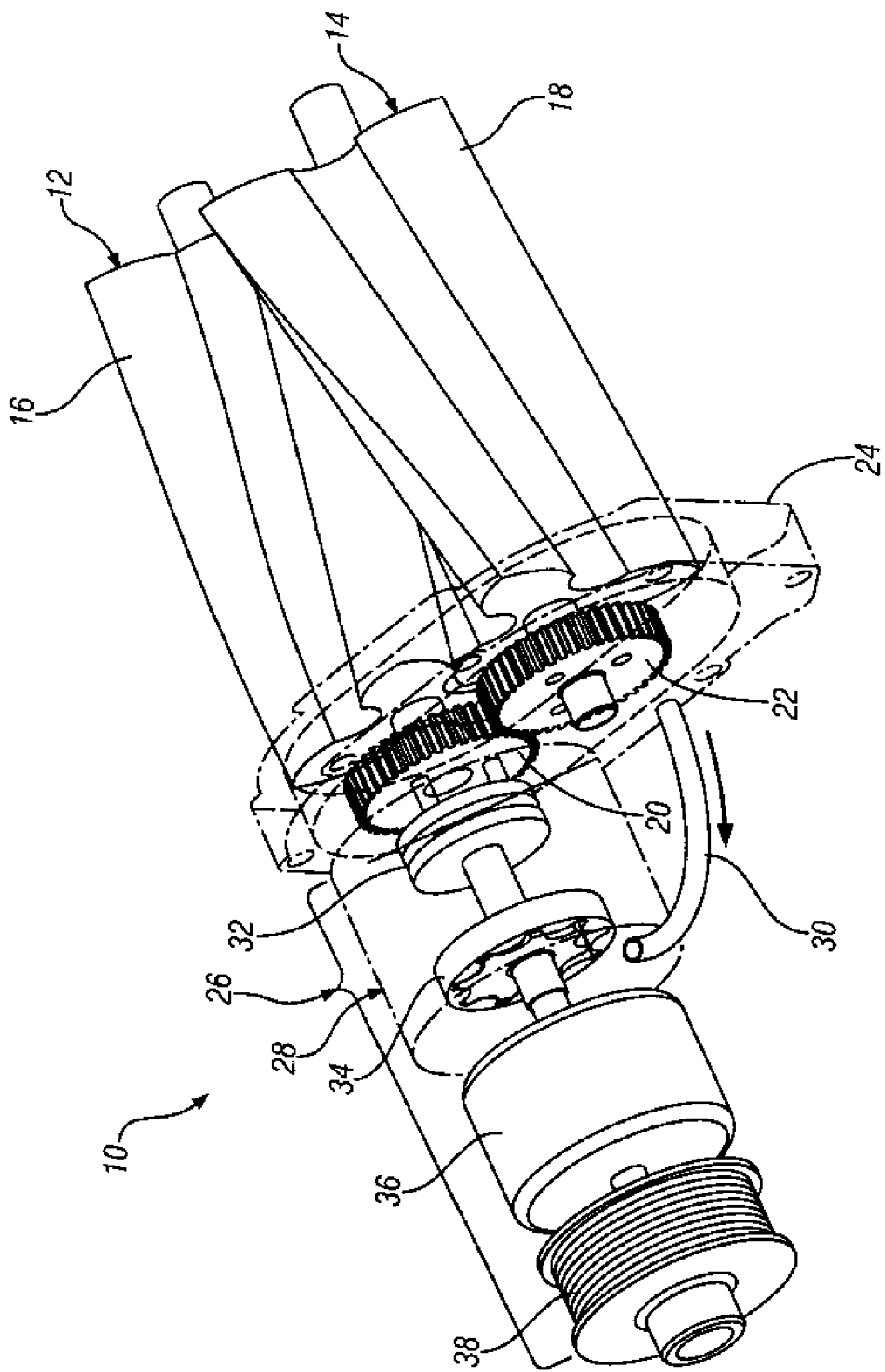
FIG. 1 is a pictorial view of an operating mechanism for an exemplary positive displacement automotive supercharger having an electrohydraulic clutch actuating servomechanism according to the invention.

Referring to FIG. 1 of the drawings in detail, numeral 10 generally indicates a first exemplary embodiment of an operating mechanism for a positive displacement supercharger having a rotor housing defining a rotor cavity, not shown, of generally known configuration. The operating mechanism 10 includes a pair of rotors 12, 14 having coactive interleaved lobes 16, 18 adapted for rotation within the rotor housing, not shown. The rotors are drivably connected to a pair of timing gears 20, 22 engaged to maintain correlated equal and opposite rotation of the rotors in the housing. The timing gears are enclosed in a gear case 24 in which a permanent charge of oil is preferably sealed.

In accordance with the invention, the operating mechanism 10 includes a servo-actuated drive train 26 engaging one 20 of the timing gears and operative, when actuated, to rotate the timing gears 20, 22 and drive the rotors 12, 14. The drive train 26 includes an enclosed clutch housing 28 adjoining the gear case and containing oil for use in the clutch housing. Optionally, the gear case 24 and the clutch housing 28 may be connected by an internal or external passage, represented schematically by a connecting hose 30, so that the gear case 24 and the clutch housing 28 share a common charge of oil.

Within the clutch housing is a hydraulic clutch 32 engaging the timing gear 20 for driving the timing gears when the clutch is engaged. A servo oil pump 34 within the clutch housing 28 is hydraulically connected with the hydraulic clutch 32. When actuated, the oil pump 34 supplies pressurized oil for engaging the hydraulic clutch 32. The pump 34 is also drivably connected to the hydraulic clutch 32 for rotating the hydraulic clutch 32 when the oil pump 34 is actuated.

The drive train 26 also includes an electromagnetic clutch 36 external to the clutch housing 28 and drivably connected with the hydraulic clutch 32 for rotating the hydraulic clutch 32 through the oil pump 34 when the electromagnetic clutch 36 is actuated. A drive member, represented by a belt drive pulley 38 is drivably connected to the electromagnetic clutch 36.

In operation, for example, in an automotive application, the drive pulley 38, or other drive member, is continuously driven by the engine while the engine is operating. As long as the electromagnetic clutch 36 is not actuated, the remainder of the drive train is not actuated and the supercharger rotors 12, 14 remain stationary. The electromagnetic clutch is externally controllable to operate the drive train 26 and drive the supercharger rotors to operate the supercharger when called for by the external control, not shown.

When the electromagnetic clutch 36 is actuated, the drive pulley is connected through the rotating electromagnetic clutch to the servo-oil pump 34, which rotates and draws oil from the clutch housing and transmits pressurized oil to the hydraulic clutch. At the same time, the rotating oil pump 34 begins rotating the input portion of the hydraulic clutch 32, to which it is connected. When the oil pressure from the pump is sufficient, it engages the hydraulic clutch 32, connecting the drive pulley 38 through the drive train 26 with the timing gear 20, which drives the rotors 12, 14 placing the supercharger operating mechanism 10 in operation.

When the supercharger is operated, it increases the potential power of the associated engine. When the servo-actuated operating mechanism 10 of the present invention is applied, the engine speed or load at which the supercharger drive train may be engaged in increased so that the supercharger will operate only when increased power is called for, thus reducing unnecessary energy drain at lower speeds and loads.

When the engine speed or load is reduced below the level requiring supercharging, the electro-magnetic clutch is deactivated and the drive train connection is broken so that the supercharger stops, eliminating the energy drain from operation of the supercharger operating mechanism 10.

Figure 2:
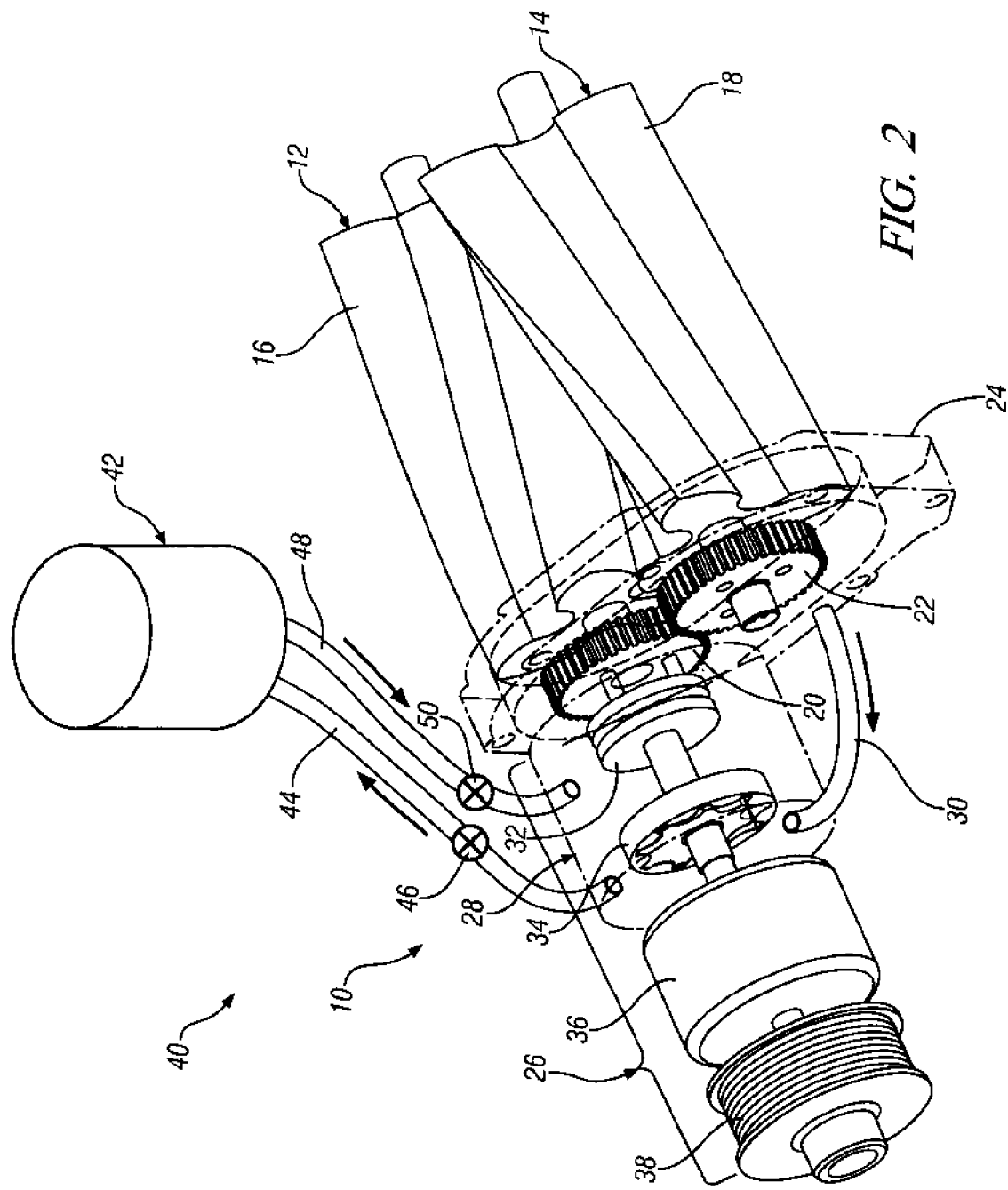
FIG. 2 is a pictorial view similar to FIG. 1 of a similar mechanism with a hydraulic accumulator added.

Referring now to FIG. 2 of the drawings, a second embodiment of operating mechanism 40 is illustrated. The previously described components and operation of the first embodiment 10 are repeated in the second embodiment 40 wherein like numerals indicate like parts and repetitious description of these features in FIG. 2 will be omitted.

The second embodiment 40 differs from embodiment 10 in the insertion of a hydraulic accumulator 42 between the servo-pump 34 and the hydraulic clutch 32. The pump 34 is connected to the accumulator 42 by a charging passage (preferably internal) represented in FIG. 2 by an external charging hose 44. A check valve 46 in the passage or hose 44 may be used to allow oil flow only from the pump 34 to the accumulator 42 to provide a charge of oil pressure in the accumulator when the pump is running.

An engagement passage (preferably internal) is represented in FIG. 2 by an engagement hose 48. A control valve 50 in the engagement passage or hose 48 is opened to pass pressurized oil from the accumulator 42 to the hydraulic clutch 32 to engage the clutch and actuate the operating mechanism and the associated supercharger.

Addition of the accumulator 42 accelerates the beginning of supercharger operation, since the pressurized oil in the accumulator 42 is transmitted to the hydraulic clutch 32 as soon as a control is actuated to start operation of the electromagnetic clutch 36, which operates the servo oil pump 34. Thus, the hydraulic clutch 32 may be engaged by the accumulator pressure before the pump has developed sufficient pressure to recharge the accumulator 42.

While the invention has been described by reference to certain preferred embodiments, it should be understood that numerous chances could be made within the spirit and scope of the inventive concepts described. Accordingly, it is intended that the invention not be limited to the disclosed embodiments, but that it have the full scope permitted by the language of the following claims.

The invention claimed is:

1. A method of operating an engine supercharger comprising a pair of coactinq rotors adapted for rotation within a rotor housing; the rotors connected to a pair of timing gears engaged to maintain correlated rotation of the rotors in the housing; a gear case enclosing the timing gears and adapted to contain a volume of oil for lubricating the gears; and a servo-actuated drive train engaging one of the timing gears and adapted when actuated to rotate the timing gears and drive the rotors, wherein the drive train further comprises an enclosed clutch housing adjoining the gear case and adapted to contain oil for use in the clutch housing; a hydraulic clutch in the clutch housing and engaging said one of the timing gears for driving the timing gears when the hydraulic clutch is engaged; a servo oil pump within the clutch housing and hydraulically connected with the hydraulic clutch, the pump adapted when actuated to supply pressurized oil for engaging the hydraulic clutch, the pump being drivably connected with the hydraulic clutch for rotating the hydraulic clutch when the oil pump is actuated; an electromagnetic clutch external to the clutch housing and drivably connected with the hydraulic clutch for rotating the hydraulic clutch when the electromagnetic clutch is actuated; and a drive member drivably connected to the electromagnetic clutch, the electromagnetic clutch being externally controllable to rotatably connect the drive member with the oil pump and rotate the oil pump for initiating actuation and rotation of the hydraulic clutch with resultant rotation of the timing gears and the supercharger rotors; the method including:
   operating the engine; and
   mechanically driving the supercharger rotors directly from the drive member through the electromagnetic clutch, the hydraulic pump rotor, the hydraulic clutch and the timing gears to the rotors.

2. The method as in claim 1 including:
   drivably connecting the supercharger drive member with a rotating drive output member of an associated engine;
   actuating the electromagnetic clutch by an external control to engage the electromagnet clutch and connect the drive member with the rotor of the hydraulic pump, thereby rotating the input of the hydraulic clutch; and
   pumping hydraulic fluid from the rotating pump to the hydraulic clutch to engage the clutch and drive the timing gear connected with the clutch, thereby rotating the gears and the supercharger rotors, and allowing engagement of the clutches at a higher engagement speed with a low power electro-magnetic clutch driving the hydraulic pump.

3. An operating mechanism for an engine positive displacement supercharger, the mechanism comprising:
   a pair of coacting rotors adapted for rotation within a rotor housing; the rotors connected to a pair of timing gears engaged to maintain correlated rotation of the rotors in the housing;
   a gear case enclosing the timing gears and adapted to contain a volume of oil for lubricating the gears; and
   a servo-actuated drive train engaging one of the timing gears and adapted when actuated to rotate the timing gears and drive the rotors, the drive train including:
   an enclosed clutch housing adjoining the gear case and adapted to contain oil for use in the clutch housing;
   a hydraulic clutch in the clutch housing and engaging said one of the timing gears for driving the timing gears when the hydraulic clutch is engaged;
   a servo oil pump within the clutch housing and hydraulically connected with the hydraulic clutch, the pump adapted when actuated to supply pressurized oil for engaging the hydraulic clutch, the pump being drivably connected with the hydraulic clutch for rotating the hydraulic clutch when the oil pump is actuated;
   an electromagnetic clutch external to the clutch housing and drivably connected with the hydraulic clutch for rotating the hydraulic clutch when the electromagnetic clutch is actuated; and
   a drive member drivably connected to the electromagnetic clutch, the electromagnetic clutch being externally controllable to rotatably connect the drive member with the oil pump and rotate the oil pump for initiating actuation and rotation of the hydraulic clutch with resultant rotation of the timing gears and the supercharger rotors.

4. The mechanism as in claim 3 wherein the gear case is sealed to retain a permanent charge of lubricant.

5. The mechanism as in claim 4 wherein the clutch housing is in communication with the gear case to allow sharing of the permanent charge of lubricant with the gear case.

6. The mechanism as in claim 3 and further including a hydraulic accumulator connected between the oil pump and the hydraulic clutch for charging the accumulator with pressurized oil from the pump and actuating the hydraulic clutch with the pressurized oil from the accumulator.

7. The mechanism as in claim 6 and further including valves for retaining oil pressure in the accumulator when the oil pump is deactivated and for reopening accumulator pressure oil flow to the hydraulic clutch when the electromagnetic clutch is reactivated.

8. The mechanism as in claim 3 wherein the drive member is a pulley.

9. An engine positive displacement supercharger comprising:
- a pair of coacting rotors adapted for rotation within a rotor housing; the rotors connected to a pair of timing gears engaged to maintain correlated rotation of the rotors in the housing;
- a gear case enclosing the timing gears and adapted to contain a volume of oil for lubricating the gears; and
- a servo-actuated drive train engaging one of the timing gears and adapted when actuated to rotate the timing gears and drive the rotors, the drive train including:
  - an enclosed clutch housing adjoining the gear case and adapted to contain oil for use in the clutch housing;
  - a hydraulic clutch in the clutch housing and engaging said one of the timing gears for driving the timing gears when the hydraulic clutch is engaged;
  - a servo oil pump within the clutch housing and hydraulically connected with the hydraulic clutch, the pump adapted when actuated to supply pressurized oil for engaging the hydraulic clutch, the pump being drivably connected with the hydraulic clutch for rotating the hydraulic clutch when the oil pump is actuated;
  - an electromagnetic clutch external to the clutch housing and drivably connected with the hydraulic clutch for rotating the hydraulic clutch when the electromagnetic clutch is actuated; and
  - a drive member drivably connected to the electromagnetic clutch, the electromagnetic clutch being externally controllable to rotatably connect the drive member with the oil pump and rotate the oil pump for initiating actuation and rotation of the hydraulic clutch with resultant rotation of the timing gears and the supercharger rotors.

10. The supercharger as in claim 9 wherein the gear case is sealed to retain a permanent charge of lubricant.

11. The supercharger as in claim 10 wherein the clutch housing is in communication with the gear case to allow sharing of the permanent charge of lubricant with the gear case.

12. The supercharger as in claim 9 and further including a hydraulic accumulator connected between the oil pump and the hydraulic clutch for charging the accumulator with pressurized oil from the pump and actuating the hydraulic clutch with the pressurized oil from the accumulator.

13. The supercharger as in claim 12 and further including valves for retaining oil pressure in the accumulator when the oil pump is deactivated and for reopening accumulator pressure oil flow to the hydraulic clutch when the electromagnetic clutch is reactivated.

14. The supercharger as in claim 9 wherein the drive member is a pulley.

* * * * *